United States Patent [19]
Pallotta et al.

[11] Patent Number: 6,089,110
[45] Date of Patent: Jul. 18, 2000

[54] TEMPERATURE PROBE POSITIONING SYSTEM

[75] Inventors: Scott A. Pallotta, Liverpool; Frank A. Volino, Cicero, both of N.Y.

[73] Assignee: Carrier Corporation, Syracuse, N.Y.

[21] Appl. No.: 09/027,385

[22] Filed: Feb. 20, 1998

[51] Int. Cl.[7] .................................................. G01K 1/14
[52] U.S. Cl. ........................... 73/866.5; 374/141; 62/129
[58] Field of Search .......................... 73/866.5; 374/141; 62/125, 129

[56] References Cited

U.S. PATENT DOCUMENTS

| | | | |
|---|---|---|---|
| 108,386 | 10/1870 | Phelps | 374/141 X |
| 627,025 | 6/1899 | Turner | 374/141 |
| 1,554,967 | 9/1925 | Freeman | 374/141 |
| 1,554,968 | 9/1925 | Freeman | 374/141 |
| 1,567,008 | 12/1925 | Spreen | 374/141 |
| 1,672,832 | 6/1928 | Spreen | 324/141 |
| 2,585,086 | 2/1952 | Brunsing | 374/141 X |
| 4,265,603 | 5/1981 | Chiyoda et al. | 374/141 X |

*Primary Examiner*—Thomas P. Noland

[57] ABSTRACT

Apparatus for supporting an elongated sensor in a partition, which is defined by a pair of spaced apart parallel walls. The sensor is supported at a predetermined angle with a sensor end on one side of the partition and an output end on the other side of the partition. The support apparatus comprises an elongated container means adapted to extend through openings in the two spaced walls with open ends on either side of the partition. The container means is open at either end and is adapted to axially and radially support the sensor therein with the sensor end of the sensor extending into a region to be sensed on one side of the partition and the output end extending to the other side of the partition. A cap and seal arrangement is provided on the output end of the container to engage the elongated container and the output end of the sensor to thereby provide an air tight seal therebetween. In the preferred embodiment, the sensor support apparatus comprises two identical sensor support means formed in as a single component.

7 Claims, 6 Drawing Sheets

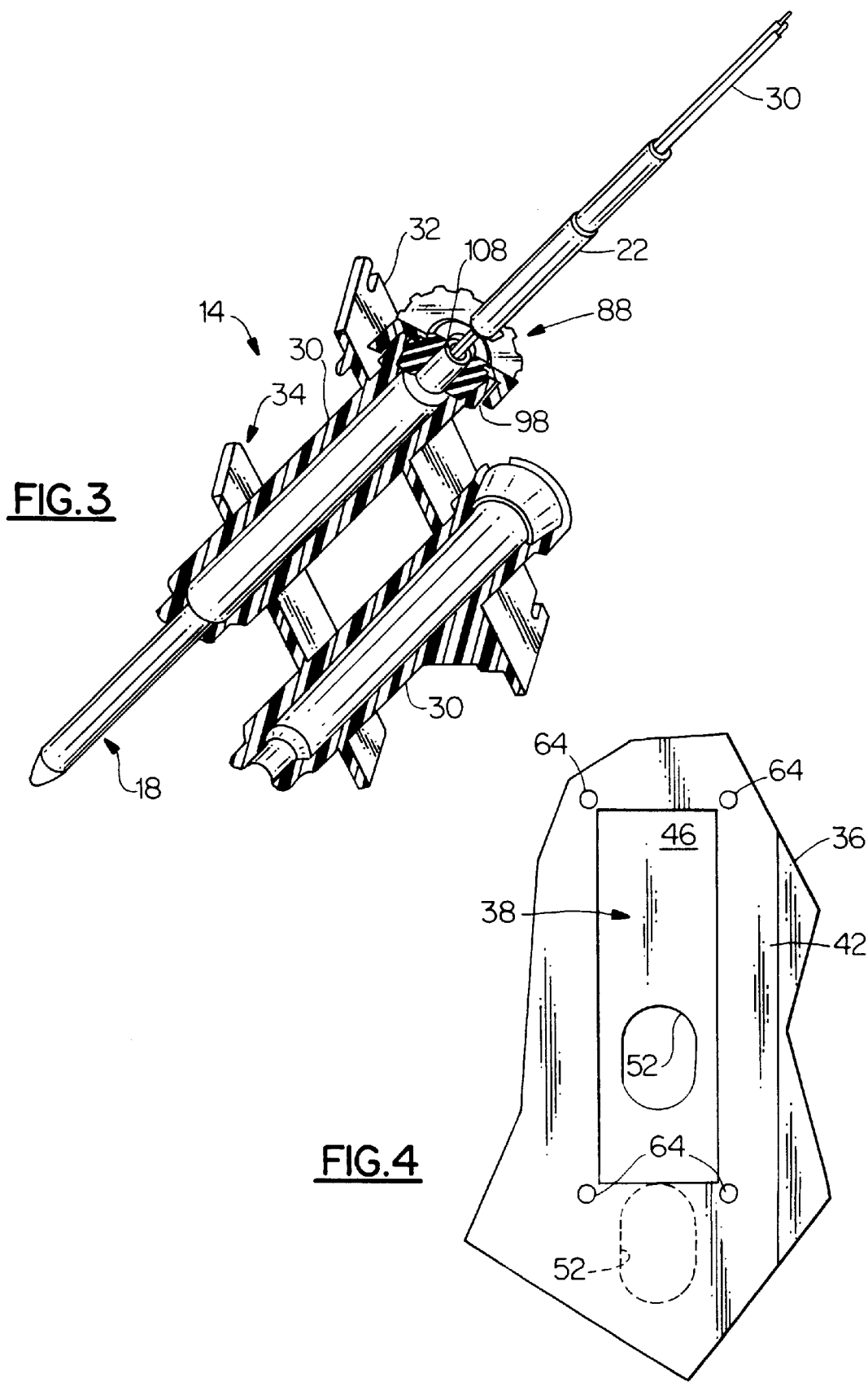

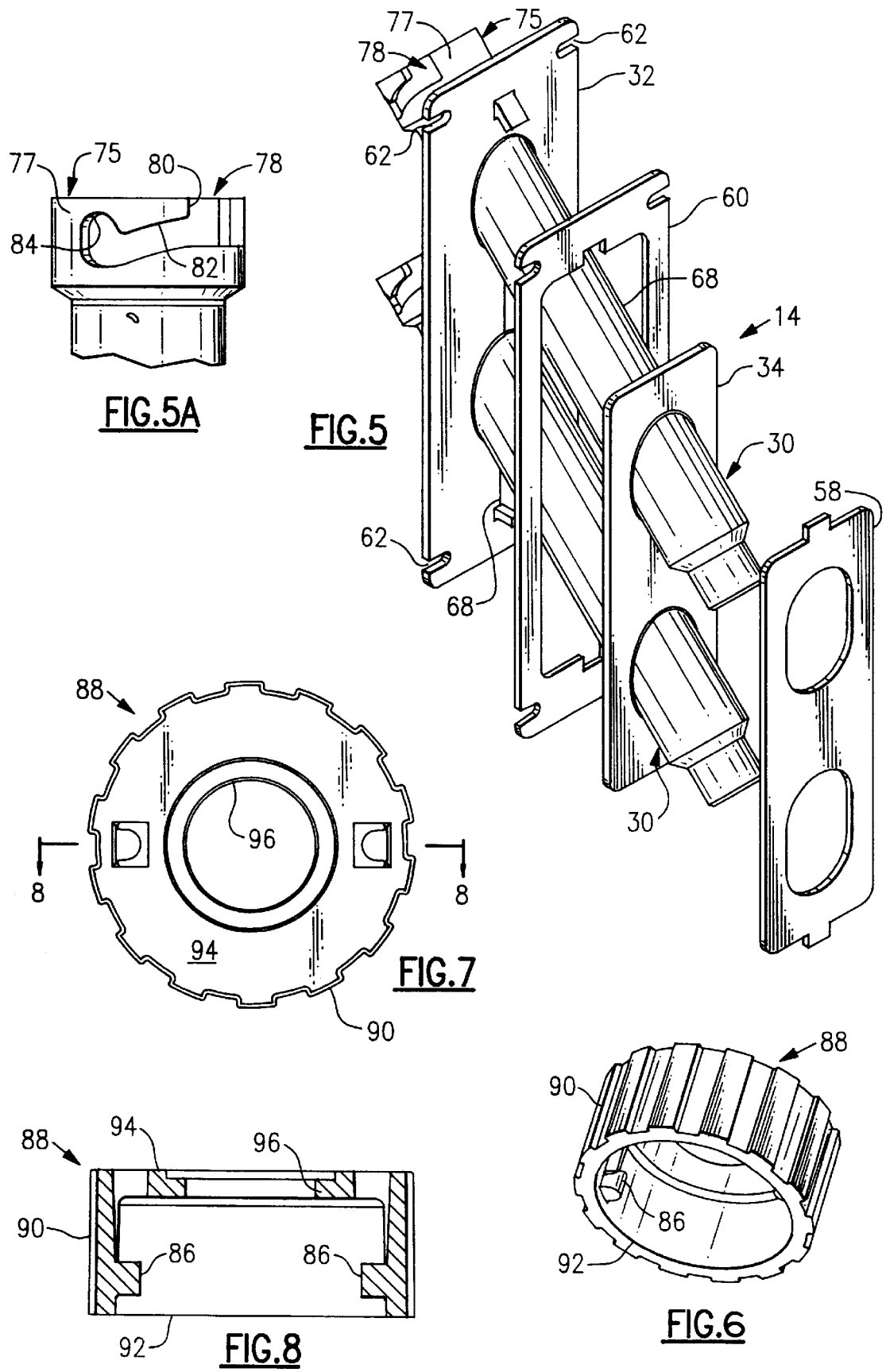

TEMPERATURE PROBE POSITIONING SYSTEM

BACKGROUND OF THE INVENTION

1. Field of the Invention

The invention relates to the positioning of a sensor, such as a temperature probe, in a desired location. More specifically, it relates to a system for supporting a temperature probe in an insulated partition wall of a refrigerated container.

2. Description of the Prior Art

Refrigeration units adapted to be mounted to the end of cargo containers for controlling the temperature within the containers are well known in the art. Such refrigeration units are typically provided with microprocessor based control systems and, often, electronic systems for recording the temperature within the container. In order to provide inputs to such controllers and recorders, it is necessary to have a temperature probe supported within the interior of the container. Accordingly, such temperature probes must pass through either an insulated wall of the container or of the refrigeration unit. It is deemed extremely desirable for such temperature probes to be accurately positioned within the container and for the penetration through the wall to be accomplished without any air leaks through the wall.

SUMMARY OF THE INVENTION

Apparatus for supporting an elongated sensor in a partition, which is defined by a pair of spaced apart parallel walls. The sensor is supported at a predetermined angle with a sensor end on one side of the partition and an output end on the other side of the partition. The support apparatus comprises an elongated container means adapted to extend through openings in the two spaced walls with open ends on either side of the partition. The container means is open at either end and is adapted to axially and radially support the sensor therein with the sensor end of the sensor extending into a region to be sensed on one side of the partition and the output end extending to the other side of the partition. A cap and seal arrangement is provided on the output end of the container to engage the elongated container and the output end of the sensor to thereby provide an air tight seal therebetween. In the preferred embodiment, the sensor support apparatus comprises two identical sensor support means formed in as a single component.

BRIEF DESCRIPTION OF THE DRAWINGS

The invention may be better understood and its objects and advantages will become apparent to those skilled in the art by reference to the accompanying drawings, in which:

FIG. 3 is a perspective, partially broken away view of the supporting apparatus of the present invention;

FIG. 4 is a front view of a double walled partition adapted to receive the supporting apparatus of the present invention;

FIG. 5 is a rear perspective view of the supporting apparatus;

FIG. 5A is an enlarged view of one end of a probe support cylinder according to the invention;

FIG. 6 is a perspective view of the retaining cap of the supporting apparatus;

FIG. 7 is bottom view of the cap of FIG. 6;

FIG. 8 is a sectional view taken along the line 8—8 of FIG. 7;

DESCRIPTION OF THE PREFERRED EMBODIMENT

Figure 1:
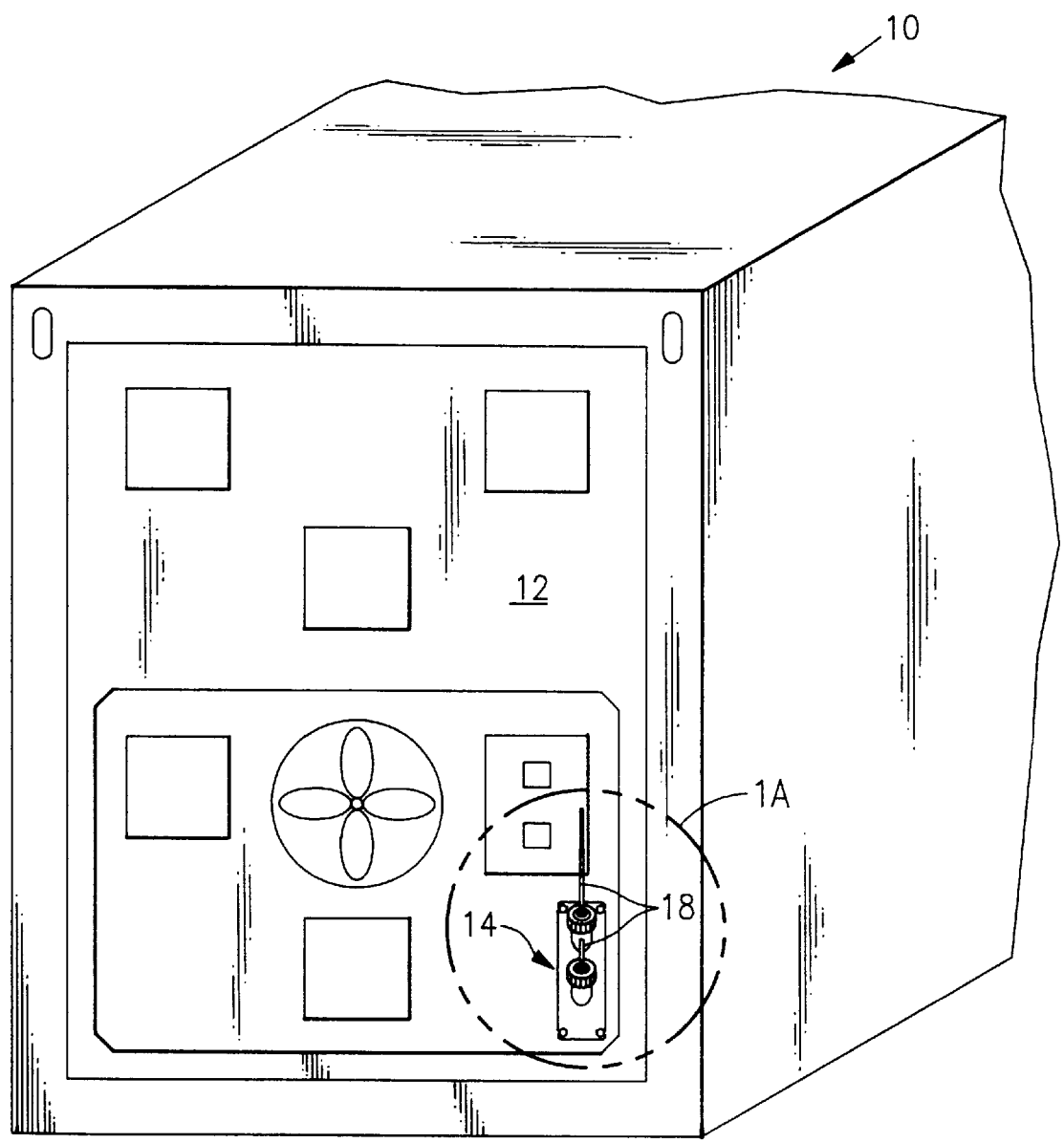
FIG. 1 is a simplified prospective view of a refrigerated transport container having a refrigeration unit making use of the present invention.

Referring first to FIG. 1, a refrigerated container 10 is shown which has associated therewith an integrated electrically operated refrigeration system 12. The refrigeration system 12 is mounted at one end of the refrigerated container and is adapted to regulate the temperature within the container 10. The refrigeration system 12 comprises a vapor compression refrigeration system, which is well known in the prior art for such application. The system is adapted to be controlled by a microprocessor based controller and may also be provided with an electronic data recorder for recording the temperature within the container. Located in the lower right hand corner of the refrigeration unit 12 of FIG. 1 is a temperature probe positioning apparatus 14, which forms the subject matter of the present invention.

As will be seen, the apparatus 14 is mounted in a double thickness insulated partition 16 which forms the back wall of the refrigeration system 12 in a manner such that a pair of temperature sensors are supported by the apparatus in the supply air flow of the refrigeration unit within the container 10.

Figure 1A:
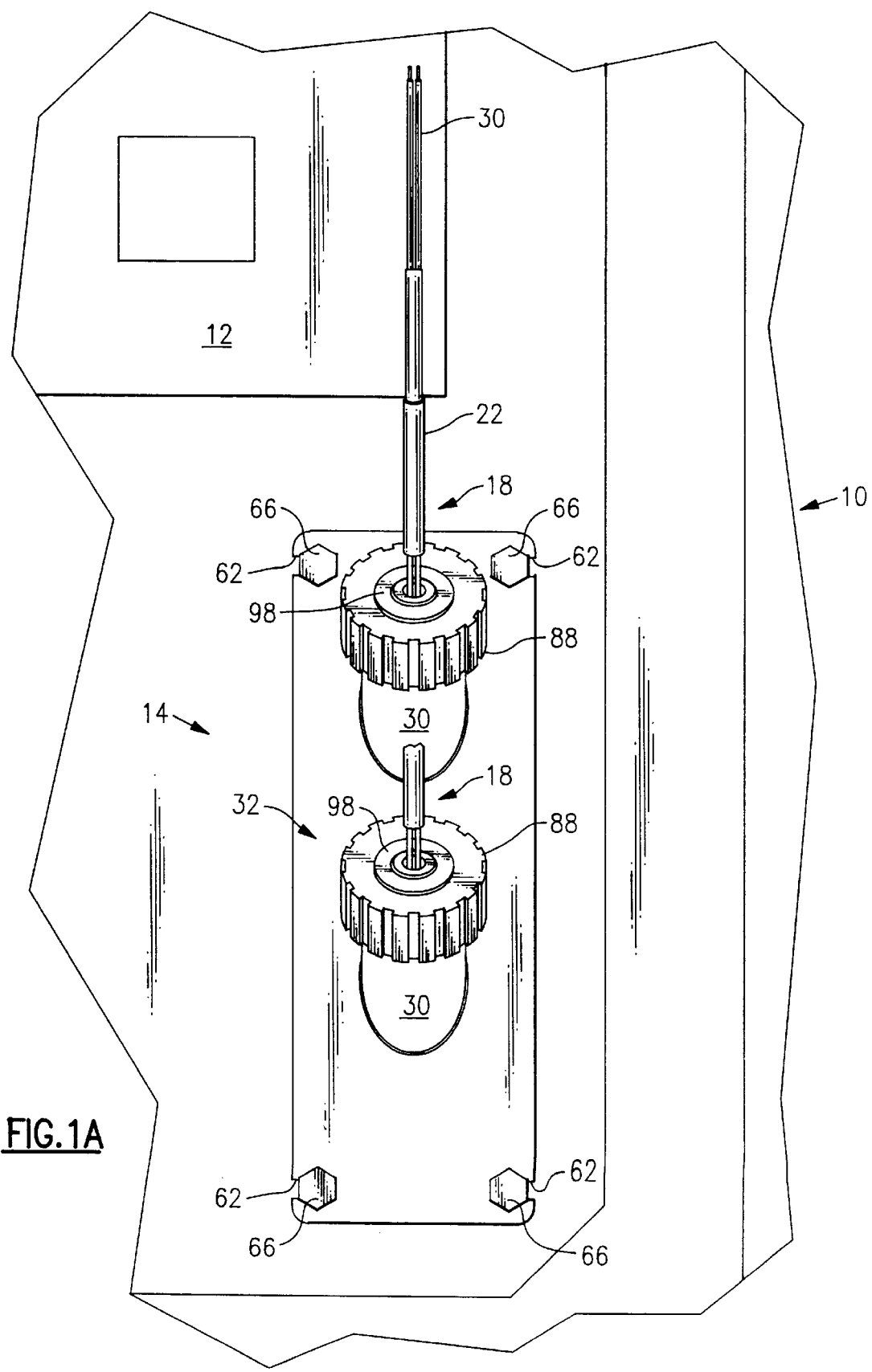
FIG. 1A is an enlarged view of the area depicted as 1A in FIG. 1.
Figure 2:
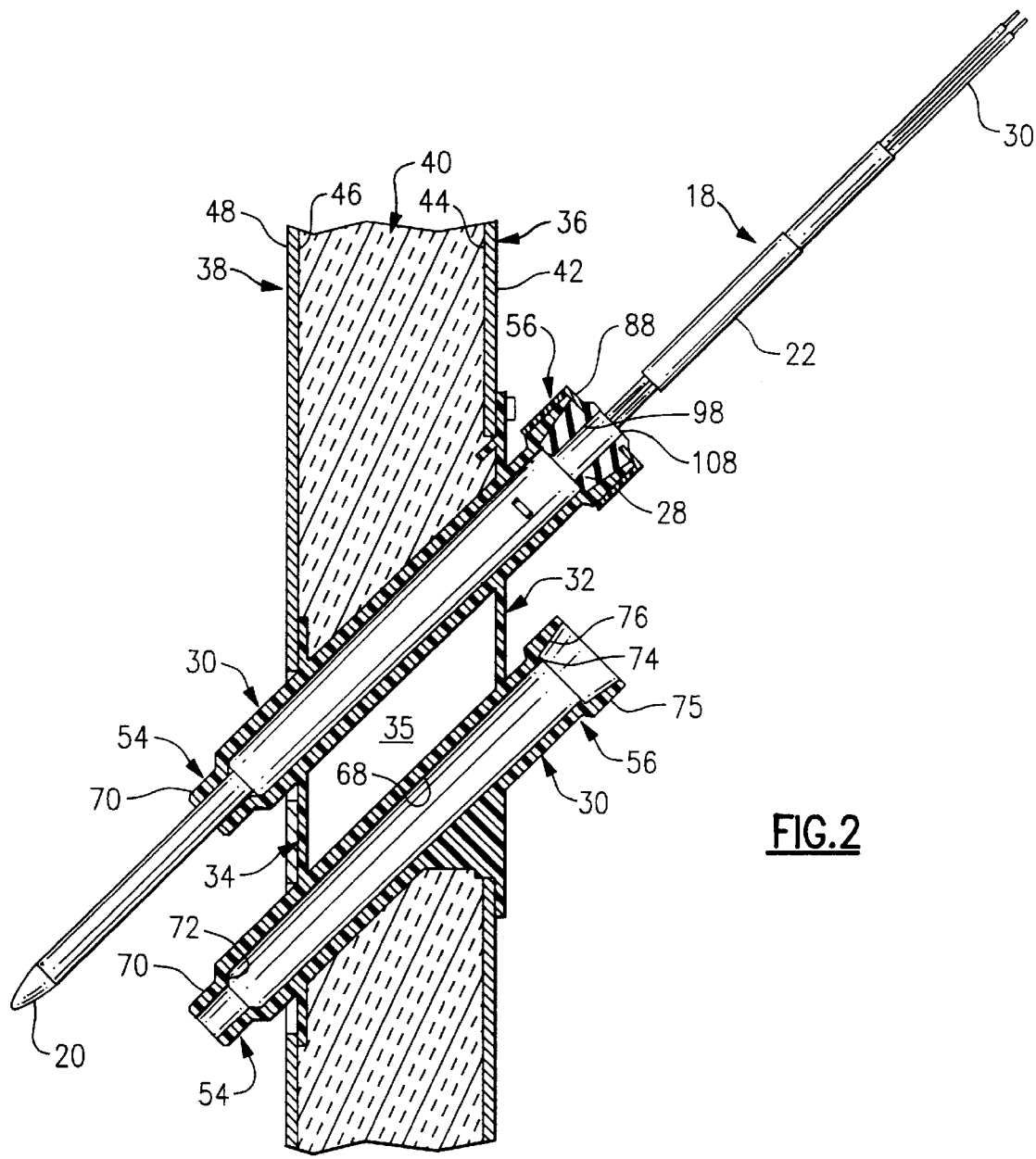
FIG. 2 is a sectional view of the supporting apparatus of the present invention mounted in a container wall.
Figure 9:
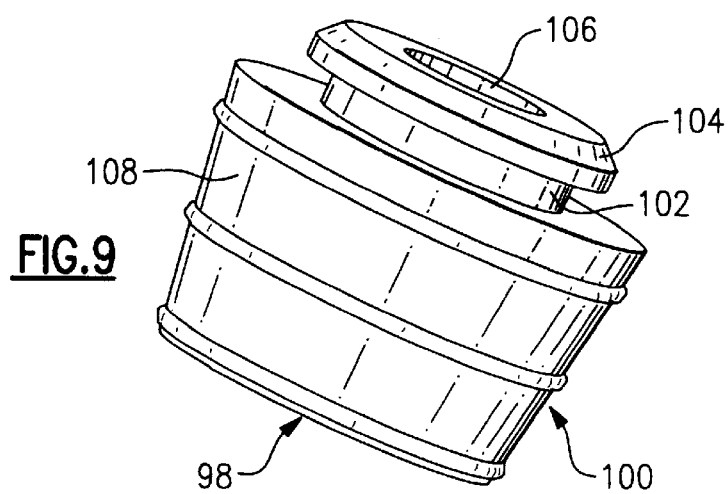
FIG. 9 is a perspective view of the retaining and ceiling grommet of the supporting apparatus.
Figure 10:
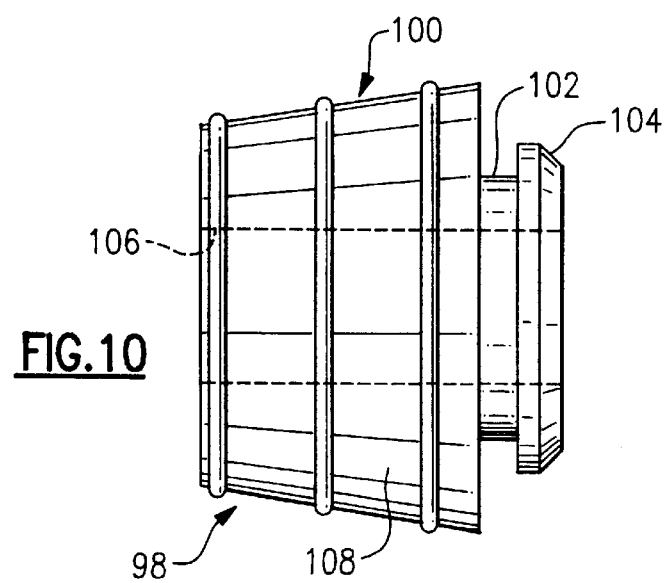
FIG. 10 is a side view of the grommet of FIG. 9.
Figure 11:
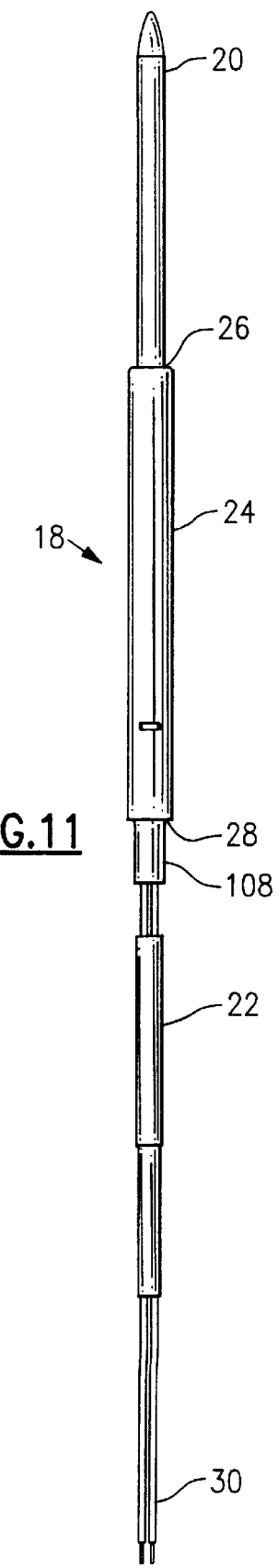
FIG. 11 illustrates the details of a temperature probe adapted to be supported in the support of the present invention.

With reference to FIGS. 1A, 2 and 11, the illustrated embodiment of the temperature probe support apparatus 14 is adapted to support two temperature probes 18 in a parallel relationship extending through the double walled partition 16. With specific reference to FIG. 11, each temperature probe 18 comprises a sensor end 20 which is adapted to be positioned in contact with an environment to be sensed and an output end 22 which, as will be seen, is adapted to extend outwardly of the probe support apparatus 14 for connection to an appropriate external lead. An elongated central section 24 of the temperature probe 18 has an enlarged diameter and transitions at a first shoulder 26 to the sensor end 20 and at a second shoulder 28 to the output end 22.

Electrical leads 30 are associated with each of the output ends 22 and in the embodiment shown where two temperature probes 18 are shown; one is connected to the system controller and the other to a data recording device for periodically recording the temperature within the container.

It will be appreciated with reference to the drawing figures that the temperature probe support apparatus 14 basically comprises two temperature probe support cylinders 30, which are supported in an angularly spaced, substantially parallel relationship, with one another by a pair of support flanges 32 and 34 and a web section 35. The cylinders 30 and the flanges 32 and 34 are adapted to engage the double thickness partition wall 16 in a manner which will now be described.

Referring now to FIG. 2, the insulated double thickness partition wall 16 is made up from a front wall 36 and a back wall 38. The space 40 between the front wall 36 and the back wall 38 is filled with an insulating material and will be referred to as the "interior of the partition 16". The right-hand side of the front wall 36 will be referred to as the "exterior surface 42 of the front wall" and the left-hand surface of the front wall 36 will be referred to as the "interior surface 44 of the front wall". Using a similar convention, the right-hand wall of the back wall 38 will be referred to as the "interior surface 46 of the back wall 38" and the left-hand facing surface of the back wall 38 will be referred to as the "exterior wall 48 of the back wall 38".

Looking now at FIGS. 2 and 4, openings provided in the front wall 36 and the back wall 38 for mounting of the temperature probe support 14 are shown. As best seen in FIG. 4, the front wall 36 is provided with a rectangular opening 50 therethrough, and the back wall 38 is provided with a pair of vertically spaced, substantially elliptically-shaped, openings 52 therethrough.

As previously briefly described, the temperature probe support apparatus 14 comprises a pair of substantially identical support cylinders 30 interconnected by a pair of flanges 32 and 34 and an interconnecting web section 35. In the preferred embodiment, these components are made up of a single injection molded part fabricated preferably from a glass filled polypropylene material. The flanges 32 and 34 are substantially parallel and vertically spaced from one another and cooperate to maintain the two support cylinders 30 at approximately a forty-five degree angle when the flanges are in a vertical orientation.

The flange 34 is substantially rectangular in shape and is sized such that it will fit through the rectangular opening 50 in the front wall 36 of the partition 16. The flange 32 is also substantially rectangular in shape and is larger in all dimensions than the rectangular opening 50 in the wall 36. As is best seen in FIG. 2, the flanges are formed with the support cylinders 30 such that a length of the support cylinders extends beyond each of the flanges outer surfaces. The ends of the support cylinders 30, which extend to the left (as viewed in FIG. 2) of the back wall 38 of the partition 16, will be referred to hereinafter as "the inside ends 54". Using a similar convention, the ends of the support cylinders 30 which extend to the right of the front wall 36 will hereinafter referred to as "the outside ends 56".

FIG. 5 illustrates the probe support apparatus 14 with a pair of gaskets 58 and 60 which serve to facilitate seal between the inner flange 34 and the outer flange 32, respectively, and mating wall sections when the probe support 14 is assembled to the partition wall 16. Installation of the probe support apparatus 14 is preferably accomplished without the temperature probes 18 installed therein. Such installation is achieved by first passing the inner flange 34 through the rectangular opening 50 in the outer wall 36 into the interior of the wall 16. The outside ends 56 of the cylinders 30 are then passed through the elliptical openings 52 in the back wall 38. Following this, the outer flange 32 is positioned in confronting relation with the exterior surface 42 of the front wall 36 and slotted openings 62 in the flange 32 are aligned with mating openings 64 provided in the front wall 36, as illustrated in FIGS. 1A, 2 and 4. Suitable threaded fasteners 66 are then used to attach the outer flange 32 to the front wall 36. Such attachment compresses the gasket 60 and establishes an air tight seal between the flange and the wall. At the same time, the inner flange 34 engages the interior surface 46 of the back wall 38 and similarly compresses the gasket 58 associated therewith.

Looking now at the installation of the temperature probes 18 within the individual support cylinders 30 of the temperature probe support apparatus 14. Because each of the support cylinders is identical, the description will address only a single cylinder and support arrangement. It should be appreciated that in several of the drawing figures, the support assembly is shown with only a single probe installed, such is done merely to facilitate illustration of all of the components and details of their interrelationship with one another.

The support cylinder 30 comprises a central bore section 68 having an inside diameter only slightly larger than the outside diameter of the elongated center section 24 of the temperature probe 18. The inside end 54 of the support cylinder 30 has a step down section 70 therein, which defines a shoulder 72 which is adapted to engage the shoulder 26 of the temperature probe 18 to thereby provide a positive stop when a temperature probe 18 is inserted into the cylinder 30.

The central bore section 68 of the support cylinder 30 terminates at a location 74 which is adjacent to the shoulder 28 on the temperature probe 18 when installed in the cylinder. From this point, the outside end 56 defines a section 75 having an enlarged outer diameter and an inner diameter, which increases from the transition point 74 to the outer end thereof; thus, defining a conical surface 76 in the interior thereof. As best seen in FIG. 5, the outside cylindrical surface 77 of the enlarged section 75 is provided with a pair of depressed, tortuous channels 78 on opposite sides thereof. FIG. 5A illustrates one of the channels 78 in detail. Each channel includes an entrance 80, a substantially laterally extending section 82, and an upwardly extending terminal region 84. Each of the channels 78 is adapted to be engaged by a mating lug 86 carried by a cap 88, which serves to retain the temperature probe 18 in the support cylinder 30.

The cap 88, as best shown in FIGS. 6 through 8, comprises a circumferentially extending side wall 90 defining an open lower end 92 and a partially closed upper end 94 having a cylindrical opening 96 centrally located therein. Located on the interior of the peripheral side wall 90 are the lugs 86, previously mentioned, which are adapted to be received in the channel 78 in the enlarged section 75 of the support cylinder 30.

Looking now at FIGS. 2, 3 and 9 through 11, a rubber grommet 98 is adapted to be installed within the cap 88 in a manner as illustrated in FIG. 2. The grommet comprises a major body portion 100 having an outer tapered configuration which is adapted to sealingly engage the conical surface 76 formed within the enlarged section 75 of the support cylinder 30. Extending from the larger end of the body portion 100 is a cylindrical section of reduced diameter 102, which has extending axially therefrom a thin circular enlarged diameter section 104. As is seen in FIG. 2, the grommet 98 is assembled to the cap 88 by forcing the thin circular section 104 through the opening 96 so that the reduced diameter section 102 is in engagement with the opening and the thin section serves as a retaining lip overlying the top 94 of the cap 88. The grommet 98 has a central opening 106 extending axially therethrough which is adapted to engage the portion 108 of the output end of the sensor adjacent the shoulder 28.

Accordingly, with the molded one piece support section of the temperature probe support apparatus 14 installed to the double wall partition 16, a pair of temperature probes 18 are then inserted into each of the support cylinders 30. Following this, a cap 88 with the grommet 98 assembled thereto is placed over the output end 22 of the sensor and the opening 106 in the grommet is engaged by the mating section 108 on the temperature probe. At this time, the tapered surface 108 of the plug engages the conical surface 76 of the support cylinder and with the lugs 86 in the cap 88 lined up with the entrances 80 to the channel 78, the cap is forced downwardly and rotated in a manner to cause the lugs 86 to move through the lateral section 82 and thence into the terminal region 84 of the channels 78. The sizing of the grommet 98 is such that when this downward action occurs, the grommet is compressed and continues to be partially in compression when the lug has engaged the terminal region 84 of the channel to thereby assure that the cap remains firmly attached to the support cylinder 30.

What is claimed is:

1. Apparatus for supporting a sensor at a position spaced from one side of a partition, said partition having a first wall defining said one side and a second wall, said walls being spaced from one another and defining a space therebetween, each of said walls having a sensor support opening formed therein, said support apparatus comprising:

an elongated, straight cylindrical sensor container adapted to receive the sensor and hold it in a desired orientation, said container having a first open end and a second open end, said container having a length greater than the distance which said first and second walls are spaced from one another;

means for supporting said elongated sensor container within said openings in said first and second walls with said first open end spaced from said one side of said partition and said second open end spaced from the other side of said partition.

2. The apparatus of claim 1 wherein said opening in said second wall is larger than said opening in said first wall;

wherein said means for supporting said elongated sensor container comprises a first support flange adjacent said first open end thereof and a second support flange adjacent said second open end thereof, said first and second support flanges each being structurally attached to said sensor container and being spaced from one another, in a substantially parallel relationship, a distance substantially equal to the distance which said first and second walls are spaced from one another;

said first flange being of a size and configuration to allow passage thereof through said opening in said second wall and to substantially overly said opening in said first wall;

said second flange being of a size and configuration to substantially overly said opening in said second wall; and means for attaching said second flange to said second wall;

whereby upon passage of said first flange through said opening in said second wall and positioning of said second flange to overly said opening in said second wall and attachment of said second flange to said second wall, said first flange will overly said opening in said first wall and said elongated sensor container will be supported in the desired position with said first open end spaced from said one side of said partition.

3. The apparatus of claim 2 wherein said sensor comprises an elongated body which has a sensing end at one thereof configured to be supported at said position spaced from said one side of said partition, and an output end at the other end thereof configured to cooperate with an external output lead; and wherein said elongated sensor container includes means for axially and radially supporting said sensor with said sensor extending through said first open end and said sensing end being located at said spaced position.

4. The apparatus of claim 3 further including a cup-shaped cap having a wall section at one end, said wall section having an opening therein adapted to receive said output end of said sensor therethrough, said wall section further including a peripherally extending wall extending perpendicularly therefrom adapted to receive said one end of said elongated container therein which contains said second open end;

said second open end of said container and said peripherally extending wall being provided with complimentary interengaging structure therein allowing them to be manually manipulated into locking engagement therebetween, said cap further having means associated therewith for engaging and axially retaining said sensor.

5. The apparatus of claim 4 wherein said means associated with said cap for engaging and axially retaining said sensor comprises an elastomeric element adapted to be received within said cap, said elastomeric element having an axial opening extending therethrough for receiving said output end of said sensor therethrough, said elastomeric element being further configured to provide an air tight seal between said sensor, said cap and said elongated sensor container.

6. The apparatus of claim 5 wherein said apparatus for supporting a sensor comprises two or more elongated sensor containers, cup-shaped caps, and elastomeric elements supported in parallel relationship to one another by said first flange and said second flange.

7. The apparatus of claim 6 wherein said two or more elongated sensor containers and said first and second flanges comprise a single molded component.

\* \* \* \* \*